July 9, 1968   M. BLUMENTRITT ET AL   3,391,600
MONOCHROMATOR
Filed May 11, 1965
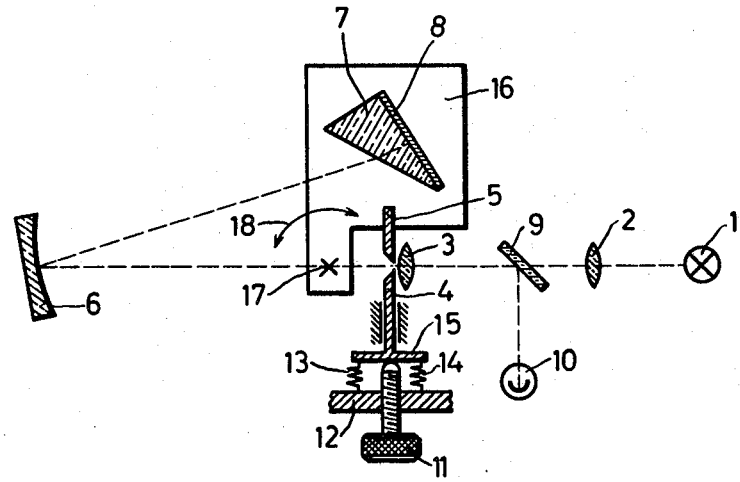

3,391,600
MONOCHROMATOR
Martin Blumentritt, Konigsbronn, Wurttemberg, and Hans-Joachim Höfert, Heidenheim (Brenz), Germany, assignors to Carl Zeiss-Stiftung, doing business as Carl Zeiss, Heidenheim (Brenz), Wurttemberg, Germany, a corporation of Germany
Filed May 11, 1965, Ser. No. 454,795
Claims priority, application Germany, May 12, 1964, Z 10,834
5 Claims. (Cl. 88—14)

The invention relates to improvements in a monochromator. In the employment of monochromators it is frequently required that the spectral band width of the radiation transmitted by the monochromator has a predetermined relationship to the median wave length of the spectral band. Frequently the requirement is made in such a manner that the spectral band width is to remain constant within a greater wave length section.

Since with a change of the wave length adjustment on the monochromator also a change of the spectral band width of radiation takes place which is transmitted by an exit slit of predetermined width it is necessary that for the fulfillment of the above-mentioned requirement the width of the monochromator slits be changed in dependence of the wave length adjustment. Therefore, the dispersion is increased, for instance, in prism monochromators when the wave length decreases, so that in this case for the maintenance of a constant spectral band width it is necessary to increase the slit width when the wave length becomes smaller.

The object of the present invention is to provide a prism monochromator in which in an extremely simple manner the slit width is so automatically controlled in dependence of the wave length adjustment that the spectral band width of the radiation transmitted by the monochromator remains approximately constant.

The object of the invention is therefore to provide a monochromator with a prism in an autocollimation arrangement provided with a slit employed simultaneously as an entrance slit and an exit slit whose width is automatically controlled in dependence of the wave length adjustment.

According to the invention one slit jaw is fixed and the other slit jaw is attached to a turntable which also carries the autocollimation mirror, whereby the axis of rotation of the turntable passes through the optical axis of the light beam passing through the slit and extends parallel to the longitudinal axis of the slit. Accordingly, one of the slit jaws moves with the turntable when the latter is caused to move and thereby the width of the slit is changed in dependence of the wave length adjustment.

When the turntable is rotatably adjusted the slit jaw which is fixedly attached to the same travels somewhat away from the slit plane defined by the other stationary slit jaw. This travel movement away from the slit plane, however, is very small in relation to the width of the slit and solely an extremely small lack of definition which in the simple devices in which the monochromator of the present invention is to be employed does not cause any disturbances. For the purpose of adjusting the slit width before rotating said turntable it is required to provide one of the two slit jaws with an adjusting device for changing the width of the slit. Preferably, this adjusting device is provided on that slit jaw which does not move when the turntable is moved.

By a suitable selection of the starting slit width and a suitable selection of the distance between the slit jaw mounted on the turntable and the point or axis of rotation of the turntable it is possible to maintain the band width approximately constant over a greater wave length range.

With these and other objects in view as will appear hereinafter the invention will now be described with reference to the accompanying drawing, the single figure of which illustrates diagrammatically one specific embodiment of a monochromator in accordance with the invention.

Referring to the drawing, the monochromator consists of the light source 1, two lenses 2 and 3, a slit formed between the opposed edges of the two slit jaws 4 and 5, a concave mirror 6 whose focal plane is placed in the plane of said slit and a semi-prism 7. The plane rear face of the prism 7 is provided with a mirror layer 8 which acts as an autocollimation mirror.

The entrance slit and exit slit respectively, of this monochromator is formed between the opposed edges of said two slit jaws 4 and 5.

The light reflected by said mirror layer 8 passes through the slit and is reflected by a semipermeable mirror 9 onto a photoelectric cell 10.

The slit jaw 4 is provided with an adjusting device which permits an adjustment of the slit width in the plane of the latter. This adjusting device comprises a screw 11 arranged within a screw thread in the housing 12 of the monochromator. By means of two springs 13 and 14 an extension 15 of the slit jaw 4 is connected to the housing 12. By rotating the adjusting screw 11 the slit jaw 4 is moved to adjust the slit width.

The semi-prism 7 is mounted on a turntable 16 rotatable about an axis 17. For the purpose of a wave length adjustment the turntable 16 is rotated about the axis 17 in the direction of the arrow 18. The axis 17 extends parallel to the refractive edge of the prism 7.

The prism 7 and the slit jaw 5 are fixedly mounted on the turntable 16 which as stated previously is rotatable about the axis 17.

The operation of the illustrated monochromator is as follows:

For viewing the long wave length range of the spectral band the adjusting screw 11 is rotated to displace the slit jaw 4 such a distance that a predetermined slit width has been attained. In order to change the wave length adjustment to shorter wave lengths a rotative adjustment of the turntable 16 is effected with the result that the prism 7 is moved about the axis 17. As a result of this adjustment the slit jaw 5 on the turntable 16 moves in such a manner transversely to the optical axis of the monochromator that the width of the slit is increased. By a selection of the distance between the axis of rotation 17 and the slit plane determined by the position of the slit jaws 4 and 5, the size of the slit width increase can be influenced. The following table indicates for different wave lengths of a predetermined wave length range the spectral band widths of a radiation transmitted by the monochromator. The center column indicates the spectral band width for a monochromator, constructed in accordance with the invention, and the right hand column indicates the spectral band width for a monochromator in which the slit width is maintained constant.

| $\lambda$ (nm) | $\Delta$ (nm) $r=1.6$ cm, $s_n=0.003$ cm | $\lambda$ (nm) $s=0.003$ cm. constant |
|---|---|---|
| 360 | 2.3 | 0.07 |
| 400 | 2.8 | 0.11 |
| 500 | 3.9 | 0.27 |
| 600 | 4.6 | 0.51 |
| 700 | 5.1 | 0.83 |
| 800 | 5.2 | 1.21 |
| 900 | 4.7 | 1.65 |
| 1,000 | 3.7 | 2.1 |
| 1,100 | 2.4 | 2.4 |

In the foregoing table $r$ denotes the distance between the slit plane and the axis of rotation.

$s_0$ the initial slit width $s$ the constant slit width

The above table shows that the spectral band width of a monochromator having a constant slit width changes within the viewed wave length range approximately about the factor 34 while in a monochromator constructed in accordance with the invention and in which the slit width is automatically changed the viewed wave length range changes only a factor of approximately 2. This change is permissible in simplier devices.

It is obvious from the foregoing that the present invention provides a monochromator in which in a very simple manner the band width of the radiation may be maintained constant within permissible limits.

We claim:

1. In a monochromator, a prism in an autocollimation arrangement, means forming simultaneously an entrance slit and an exit slit, and means for automatically controlling the width of said slit in dependence of the wave length adjustment, said last named means including two slit jaws between which a slit is formed, a turntable upon which one of said slit jaws and a mirror forming a part of said autocollimation arrangement are fixedly mounted in such a manner that the axis of rotation of said turntable extends perpendicularly through the optical axis of the light beam which passes through said slit and is positioned parallel to and spaced from said slit.

2. In a monochromator, a prism in an autocollimation arrangement, means forming simultaneously an entrance slit and an exit slit, and means for automatically controlling the width of said slit in dependence of the wave length adjustment, said last named means including two slit jaws between which a slit is formed, a turntable upon which one of said slit jaws and a mirror forming a part of said autocollimation arrangement are fixedly mounted in such a manner that the axis of rotation of said turntable extends perpendicularly through the optical axis of the beam of light which passes through said slit and is positioned parallel to said slit and spaced therefrom, said autocollimation arrangement including also a concave reflector whose focal plane is arranged in the plane of said slit.

3. In a monochromator, a prism in an autocollimation arrangement, means forming simultaneously an entrance slit and an exit slit, and means for automatically controlling the width of said slit in dependence of the wave length adjustment, said last named means including two slit jaws between which a slit is formed, a turntable upon which one of said slit jaws and a mirror forming a part of said autocollimation arrangement are fixedly mounted in such a manner that the axis of rotation of said turntable extends perpendicularly through the optical axis of the beam of light which passes through said slit and is positioned parallel to said slit and spaced therefrom, and adjusting means for one of said slit jaws for adjusting the slit width before rotating said turntable.

4. In a monochromator, a prism in an autocollimation arrangement, means forming simultaneously an entrance slit and an exit slit, and means for automatically controlling the width of said slit in dependence of the wave length adjustment, said last named means including two slit jaws between which a slit is formed, a turntable upon which one of said slit jaws and a mirror forming a part of said autocollimation arrangement are fixedly mounted in such a manner that the axis of rotation of said turntable extends perpendicularly through the optical axis of the beam of light which passes through said slit and is positioned parallel to said slit and spaced therefrom and means for adjusting the other one of said slit jaws for changing the slit width before rotating said turntable.

5. In a monochromator, a prism in an autocollimation arrangement, means forming simultaneously an entrance slit and an exit slit, and means for automatically controlling the width of said slit in dependence of the wave length adjustment, said last named means including two slit jaws between which a slit is formed, a turntable upon which one of said slit jaws and a mirror forming a part of said autocollimation arrangement are fixedly mounted in such a manner that the axis of rotation of said turntable extends perpendicularly through the optical axis of the beam of light which passes through said slit and is positioned parallel to said slit and spaced therefrom and means for adjusting the other one of said slit jaws for changing the slit width before rotating said turntable, said autocollimation arrangement including also a concave reflector whose focal plane is arranged in the plane of said slit.

No references cited.

JEWELL H. PEDERSEN, *Primary Examiner.*

V. P. McGRAW, *Assistant Examiner.*